Aug. 20, 1957  E. J. TURNEY  2,803,811
VEHICLE DIRECTION INDICATOR SYSTEMS
Filed Oct. 19, 1955  5 Sheets-Sheet 1

INVENTOR
Eric James Turney
BY
ATTORNEY

Aug. 20, 1957  E. J. TURNEY  2,803,811
VEHICLE DIRECTION INDICATOR SYSTEMS
Filed Oct. 19, 1955  5 Sheets-Sheet 4
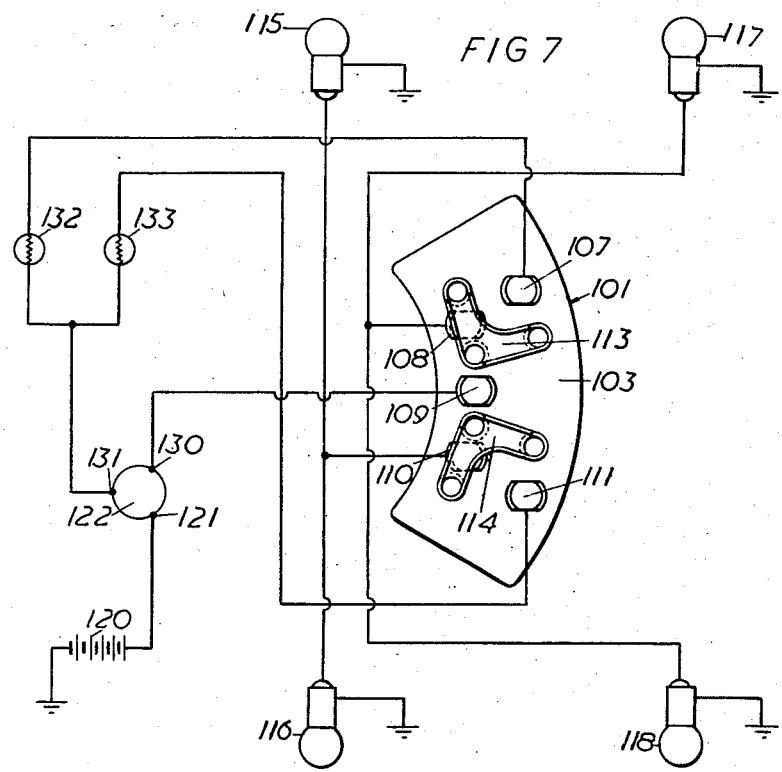
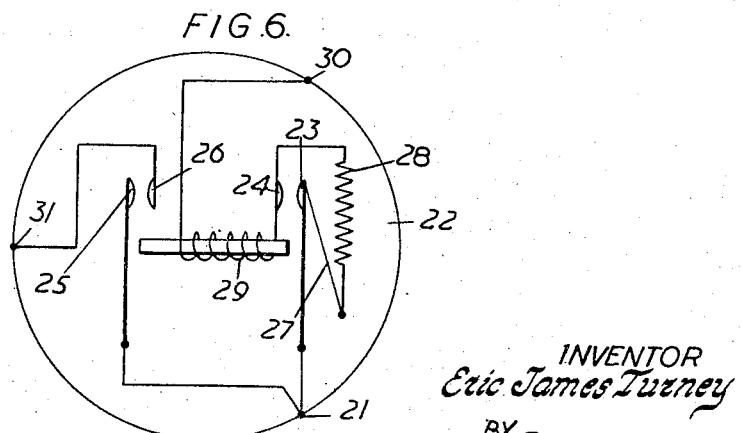
INVENTOR
Eric James Turney
BY
J. E. Jones
ATTORNEY Aug. 20, 1957  E. J. TURNEY  2,803,811
VEHICLE DIRECTION INDICATOR SYSTEMS
Filed Oct. 19, 1955  5 Sheets-Sheet 5
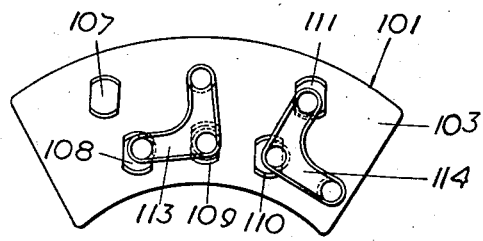
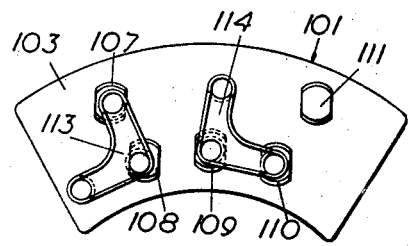
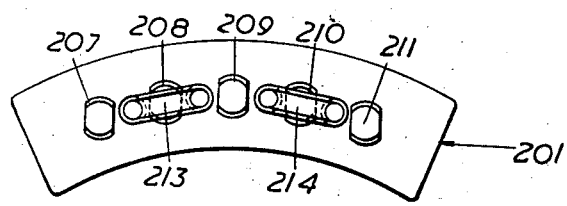
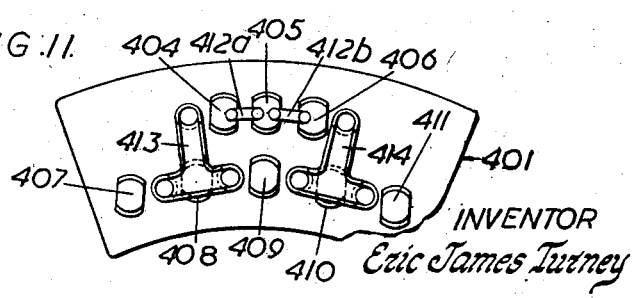
INVENTOR
Eric James Turney
BY
ATTORNEY

United States Patent Office 2,803,811
Patented Aug. 20, 1957

2,803,811

VEHICLE DIRECTION INDICATOR SYSTEMS

Eric J. Turney, Dunstable, England, assignor to General Motors Corporation, Detroit, Mich., a corporation of Delaware Application October 19, 1955, Serial No. 541,452

Claims priority, application Great Britain November 10, 1954

3 Claims. (Cl. 340—80)

This invention relates to vehicle direction indicator systems.

In the past such a system has incorporated an electrical switch having an intermediate position and two side positions and connected in such a way as to complete, in each side position, a circuit to one or more indicator lamps through a flasher device, which permits periodic full energization of the indicator lamp or lamps and has a pair of pilot contacts engageable upon a full energization of the indicator lamp or lamps to illuminate one of a pair of pilot lamps.

The circuit for each pilot lamp has included the filament of the non-energized indicator lamp or lamps and there was a direct connection from each pilot lamp to such indicator lamp. In the event of a failure of an indicator lamp to be illuminated, the pilot contacts of the flasher device are not engaged, but a circuit is completed through the electrical switch, both pilot lamps and the indicator lamp not intended to be illuminated. This causes the pilot lamps to flash together.

While such simultaneous flashing can be recognized as indicative of a fault by an alert and attentive driver, traffic conditions may prevent much attention being given to the pilot lamps and their flashing may be accepted as indicative of correct flashing of the indicator lamps.

The object of the invention is to provide a vehicle direction indicator system incorporating pilot lamps which are not illuminated if a fault occurs in a corresponding indicator lamp.

Accordingly each pilot lamp is connected to a pilot contact of the electrical switch which in a side position is connected to a contact connected to the non-energized indicator lamp.

Preferably, the electrical switch comprises at least two movable bridge contacts and five fixed contacts and, in each side position one bridge contact connects a middle fixed contact, connected to the flasher device, to one of a pair of fixed contacts, each connected to an indicator lamp and the other bridge contact connects the other of the pair of fixed contacts to one of a pair of fixed pilot contacts each connected to a pilot lamp.

If the system includes front and rear indicator lamps on each side and a stop light switch, the electrical switch may have, in addition to the two movable contacts and five fixed contacts, three fixed contacts arranged in a separate row and another bridge contact movable from an intermediate position, in which the bridge contact engages all three fixed contacts, to one or other of two positions, in which the bridge contact engages the middle fixed contact, connected to the stop light switch, and one of the end fixed contacts, each of which is connected to a rear indicator lamp.

Further objects and advantages of the present invention will be apparent from the following description, reference being had to the accompanying drawings, wherein:

Fig. 6 is a diagram of the flasher device;

Fig. 7 is a circuit diagram of a second embodiment of a vehicle direction indicator system according to the invention;

Fig. 8 is a diagram of the switch shown in Fig. 7 in a side position to indicate a right turn;

Fig. 9 is a diagram similar to Fig. 8 with the switch in the other side position;

Fig. 10 is a diagram of an alternative switch for use in the system shown in Fig. 7; and Fig. 11 is a diagram of an alternative switch for used in the system shown in Fig. 1.

Figure 4:
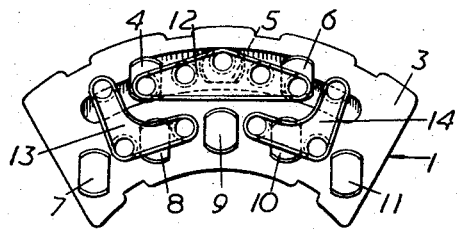
Fig. 4 is a plan from above of the electrical switch with the case and movable contact carried removed.
Figure 5:
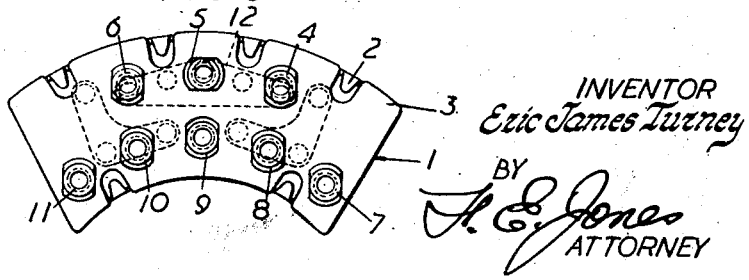
Fig. 5 is a plan from below of the electrical switch.

The direction indicator system includes an electrical switch 1 (Figs. 4 and 5) which comprises a case 2 closed by an insulator cover 3 through which project eight terminal contacts 4, 5, 6, 7, 8, 9, 10 and 11 in two rows of three terminal contacts 4, 5 and 6 and five terminal contacts 7, 8, 9, 10 and 11, respectively. The rows lie on arcs of concentric circles.

In the switch 1 is a slidable insulator carrier (not shown) which supports a first bridge contact 12 and a pair of bridge contacts 13 and 14 and is movable in an arcuate path in the case 2 by a finger (not shown) which projects into the carrier and is carried by a ring plate pivoted in a housing on the steering column of a vehicle. The ring plate is connected to a lever which is readily accessible to the vehicle driver.

The bridge contacts 12, 13 and 14 are spring urged towards the insulator cover and terminal contacts.

The first bridge contact 12 is long enough to bridge the first row of contacts 4, 5 and 6. Each of the pair of bridge contacts 13 and 14 is L shaped and has a foot portion and a stroke portion. The length of each foot portion is greater than the distance between adjacent fixed contacts of the second row of five terminal contacts 7, 8, 9, 10 and 11. Each stroke portion is longer than the distance between adjacent contacts 4, 8 and 6, 10 of the two rows.

Figure 1:
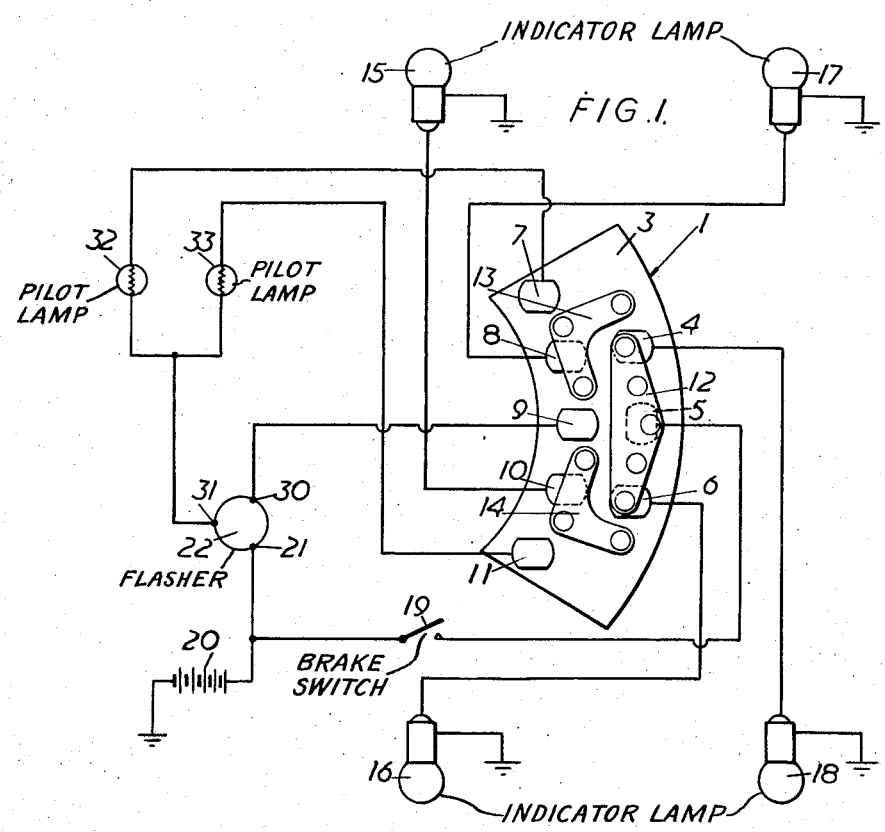
Fig. 1 is a circuit diagram of one embodiment of vehicle direction indicator system according to the invention.
Figure 2:
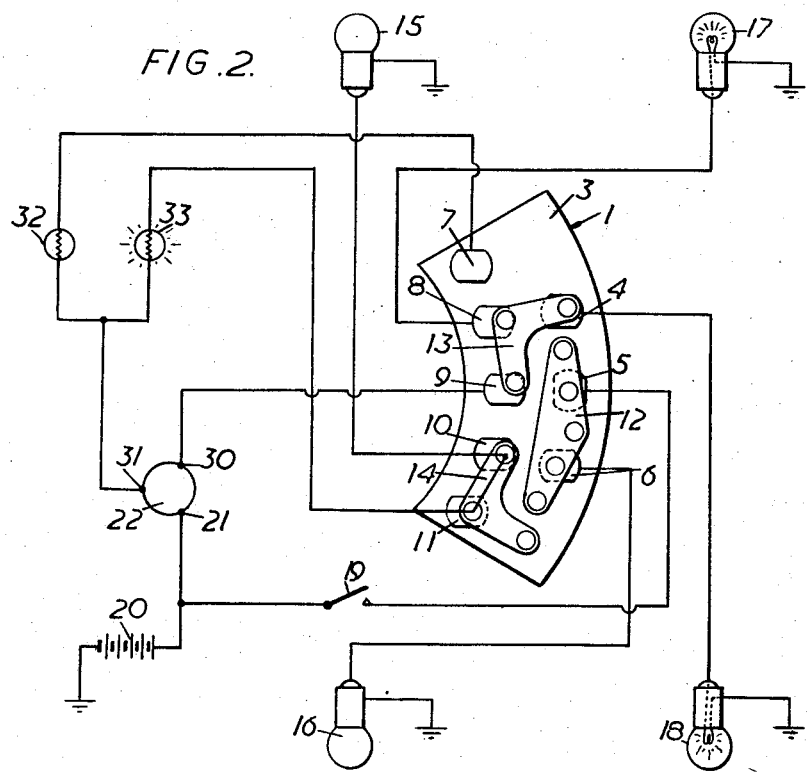
Fig. 2 is a similar diagram with the electrical switch in a side position to indicate a right turn.

The disposition of the first bridge contact 12 is such that in the intermediate position (Fig. 1) of the carrier, the bridge contact engages all three fixed contacts 4, 5 and 6 which are thus electrically connected. In each of the two side positions (Figs. 2 and 3) of the carrier, the bridge contact engages the middle fixed contact 5 and one end fixed contact 4 or 6.

The disposition of the pair of bridge contacts 13, 14 is such that, in the intermediate position (Fig. 1) of the carrier, each bridge contact 13, 14 engages an intermediate fixed contact 8, 10 of the second row of five contacts. In each of the two side positions (Figs. 2 and 3) of the carrier, one bridge contact 13 or 14 engages the middle fixed contact 9 and the intermediate fixed contact 8 or 10 of the second row and the end fixed contact 4 or 6 of the first row which is not engaged by the first bridge contact 12. The other bridge contact 14 or 13 of the pair engages the intermediate fixed contact 10 or 8 and the end fixed contact 11 or 7 of the second row.

The direction indicator system also includes front and rear, left and right indicator lamps, 15, 16, 17 and 18, respectively. Each front indicator lamp 15, 17 has a terminal connected to an intermediate fixed contact 10, 8 of the second row. Each rear indicator lamp 16, 18 has a terminal connected to an end fixed contact 6, 4 of the first row. The other terminals of the indicator lamps are connected to earth. The middle fixed contact 5 of the first row is connected through a stop light switch 19 to the positive side of a battery 20 whose negative side is connected to earth. The positive side of the battery is also connected to the positive terminal 21 of a flasher device 22 which permits periodic full energisation of a pair of indicator lamps 15, 16 or 17, 18.

The flasher device 22 (Fig. 6) has two pairs of contacts, main contacts 23, 24 and pilot contacts 25, 26, of which one of each pair is mounted on a spring arm and connected to the positive terminal 21. The spring arm carrying the main contact 23 acts in a direction to engage the contacts 23 and 24 but is held back by an expansible wire 27 connected between the contact 23 and a fixed part of the device, between which and the contact 24 a resistance 28 is connected. The spring arm carrying the pilot contact 25 acts in a direction to separate the contacts 25 and 26, but is subject to the attraction of a solenoid to engage the contacts. The coil 29 of the solenoid is connected between the main contact 24 and an output teminal 30 connected to the fixed contact 9. The pilot contacts 25 and 26 are engageable upon a full energisation of a pair of indicator lamps and are not engageable if only one indicator lamp is fully energised. The wire 27 expands and contracts successively, to energise fully a pair of indicator lamps periodically. The pilot contact 26 is connected to a pilot terminal 31 of the flasher device 22, which in turn is connected to the one terminals of a pair of pilot lamps 32, 33. The other terminals of the pilot lamps 32, 33 are connected to the respective end fixed contacts 7, 11 of the second row.

In the intermediate position of the carrier (Fig. 1) there is no connection from the flasher device 22 to the indicator lamps 32, 33 as the middle fixed contact 9 of the second row is not engaged by a bridge contact 13 or 14. If, however, the stop light switch 19 is closed, current flows from the battery 20 through the middle fixed contacts 5 of the first row, the first bridge contact 12, the end fixed contacts 4 and 6 and both rear indicator lamps 16 and 18.

If the carrier is moved to a side position to indicate a right hand turn (Fig. 2), current flows through the flasher device 22, the middle fixed contact 9, the bridge contact 13, the intermediate fixed contact 8, of the second row and the front indicator lamp 17 and through the end fixed contact 4 of the first row and the rear indicator lamp 18. Thus current at first flows through the wire 27 and resistance 28 of the flasher device and is insufficient to illuminate the indicator lamps. As the wire 27 warms up however, it expands and allows the main contacts 23 and 24 to engage, thus short circuiting the resistance 28 and giving a full energisation of the indicator lamps. The wire 27 cools down, contracts and separates the contacts 23 and 24 so that an indication of the direction of the proposed turn is given by the intermittent flashing of the front and rear indicator lamps on the right side. Each time the main contacts 23 and 24 engage and both indicator lamps are fully energised, the pilot contacts 25 and 26 of the flasher device 22 are engaged by the attraction of the solenoid coil 29. Current flows through the correct pilot lamp 33, the end fixed contact 11 of the second row, the other bridge contact 14 of the pair, the intermediate fixed contact 10 and the filament of the front indicator lamp 15 which is not energised.

If the carrier is moved to a side position to indicate a left hand turn (Fig. 3), current flows through the flasher device 22, the middle fixed contact 9, the bridge contact 14, the intermediate fixed contact 10, of the second row and the front indicator lamp 15 and through the end fixed contact 6 of the first row and the rear indicator lamp 16. The resistance 28 inserted in the circuit is short-circuited intermittently by the flasher device as described above and an indication of the direction of the proposed turn is thus given by the intermittent flashing of the front and rear indicator lamps 15, 16 on the left side. At the same time, the pilot contacts 25, 26 of the flasher device close when both front and rear indicator lamps are fully energised and current flows through the correct pilot lamp 32, the end fixed contact 7 of the second row, the other bridge contact 13 of the second pair, the intermediate fixed contact 8 and the filament of the front indicator lamp 17 which is not energised.

If either a front or a rear indicator lamp fails, there is insufficient current in the coil 29 to extract the spring arm to close the pilot contacts in the flasher unit so that no circuit through the pilot lamps can be completed. Accordingly the corresponding pilot lamp does not flash and an indication that a fault has arisen in the circuit is given.

If the right hand rear lamp 18 fails, the right hand pilot lamp 33 will not light when a right turn signal (Fig. 2) is given. The left hand pilot lamp 32 will, however, light when a left turn signal (Fig. 3) is given. If the left hand rear indicator lamp 16 fails, the left hand pilot lamp 32 will not light when a left turn signal (Fig. 3) is given. The right hand pilot lamp 33 will, however, light when a right turn signal (Fig. 2) is given.

If one of the front indicator lamps 15, 17 fails, neither right nor left pilot lamp 33, 32 will light, irrespective of the turn signal given, as there is no return path to earth.

Accordingly, a positive warning is always obtained in the case of a fault in the indicator system and it is a simple matter to determine which lamp has failed.

Figure 3:
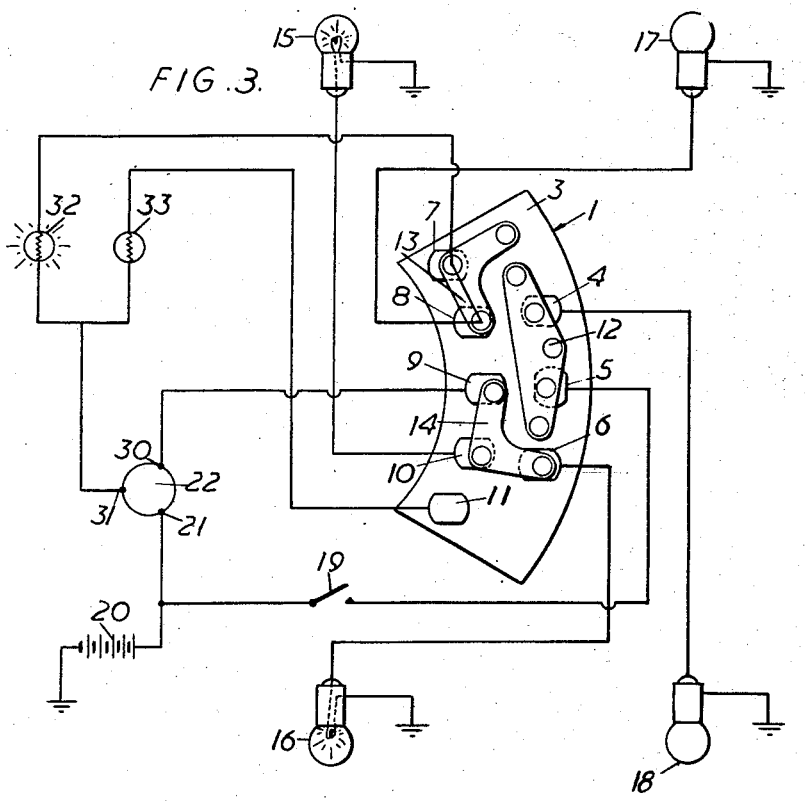
Fig. 3 is a similar diagram, with the electrical switch in the other side position to indicate a left turn.

While a turn signal is being given, the stop light switch 19 can be closed to illuminate continuously the nonenergised rear indicator lamp through the fixed contact 5, the bridge contact 12 and the fixed contact 6 (Fig. 2) or the fixed contact 4 (Fig. 3).

In the alternative embodiment shown in Figs. 7 to 9, the rear indicator lamps are not used as stop lights and the stop light switch is eliminated. The switch 101 is similar to the switch 1 and has an insulator cover 103 through which project five terminal contacts 107, 108, 109, 110 and 111 in two rows of two terminal contacts 107, 111 and three terminal contacts 108, 109 and 110, respectively. The rows lie on arcs of concentric circles.

In the switch 101 is a slidable insulator carrier (not shown) which supports a pair of bridge contacts 113, 114 and is movable in an arcuate path by a finger (not shown) which projects into the carrier and is carried by a ring plate pivoted in a housing on the steering column of a vehicle. The ring plate is connected to a lever which is readily accessible to the vehicle driver.

The bridge contacts 113, 114 are spring urged towards the insulator cover and terminal contacts and each is L-shaped and has a foot and stroke portion. The length of each foot portion is greater than the distance between adjacent fixed contacts of the second row of three terminal contacts. Each stroke portion is longer than the distance between adjacent contacts 110, 111 and 107, 108 of the two rows.

The disposition of the bridge contacts 113, 114 is such that, in the intermediate position (Fig. 1) of the carrier, each bridge contact 113, 114 engages a side fixed contact 108, 110 of the second row of three contacts. In each of the two side positions of the carrier, one bridge contact 113 or 114 engages the middle fixed contact 109 and the side fixed contact 108 or 110 of the second row and the other bridge contact 114 or 113 engages the side fixed contact 110 or 108 of the second row and the end fixed contact 111 or 107 of the first row.

The direction indicator system also includes front and rear, left and right indicator lamps 115, 116, 117 and 118, respectively. Each left indicator lamp 115, 116 has a terminal connected to a side fixed contact 110 of the second row. Each right indicator lamp 117, 118 has a terminal connected to said fixed contact 108 of the second row. The other terminals of the indicator lamps are connected to earth. The positive side of a battery 120 whose negative side is connected to earth is connected to a positive terminal 121 of a flasher device 122, which is similar to the flasher device 22 and permits periodic full energisation of a pair of indicator lamps 115, 116 or 117, 118. This flasher device has a pair of pilot contacts, one connected to the terminal 121 and the other to a pilot terminal 131, which contacts are engageable upon a full energisation of a pair of indicator lamps. The pilot contacts are not engageable if only one indicator lamp is fully energised. The flasher device 122 has a pair of main contacts, a resistance, an expansible wire and solenoid coil similar to the device 22, and a main terminal 130 connected to the middle fixed contact 109. The pilot terminal 131 is connected to the one terminals of a pair of pilot lamps 132, 133, the other terminals of which are connected to the respective end contacts 107, 111 of the first row.

If the carrier is moved to a side position to indicate a right hand turn (Fig. 8), current flows through the flasher device 122, the middle fixed contact 109, the bridge contact 113, the side fixed contact 108 of the second row, and the front and rear indicator lamps 117, 118. Thus an indication of the direction of the proposed turn is given by intermittent flashing of the indicator lamps on the right side. At the same time, the pilot contacts close when both front and rear indicator lamps are fully energised and current flows through the correct pilot lamp 133, the end fixed contact 111 of the first row, the bridge contact 114, the side fixed contact 110 and the filaments of the non-energised indicator lamps.

For a left hand turn, the carrier is moved to the side position shown in Fig. 9.

If a right hand indicator lamp fails, the right hand pilot lamp will not light when a right turn signal is given, but the left hand pilot lamp will light when a left turn signal is given as there is a return path to earth through the remaining effective right hand indicator lamp.

If a left hand indicator lamp fails, the left hand pilot lamp will not light when a left turn signal is given, but the right hand pilot lamp will light when a right turn signal is given.

If both indicator lamps on one side fail, neither right nor left pilot lamp will light, irrespective of the turn signal given, as there is no return path to earth.

The switch 101 in the system shown in Fig. 7 may be replaced by the switch 201 illustrated in Fig. 10. In this case, the pilot lamps 132, 133 are connected to end fixed contacts 207, 211 respectively, the left hand indicator lamps 115, 116 are connected to an intermediate fixed contact 210, the right hand indicator lamps 117, 118 are connected to an intermediate fixed contact 208 and the main terminal 130 of the flasher device 122 is connected to a middle fixed contact 209. The switch 201 has a carrier (not shown) in which two bridge contacts 213, 214 are carried and spring urged towards the fixed contacts.

In a side position, one bridge contact engages the middle fixed contact and one intermediate contact and the other bridge contact engages the other intermediate contact and the adjacent end contact.

The operation of the system is similar to that shown in Figs. 7 to 9.

The switch 1 of the system shown in Figs. 1 to 6 may be replaced by the switch 401 illustrated in Fig. 11. In this case the rear indicator lamps 16, 18 are connected to end fixed contacts 404, 406, respectively of a first row of three contacts, the pilot lamps 32, 33 are connected to end fixed contacts 407, 411, respectively, of a second row of five contacts, the front indicator lamps 15, 17 are connected to intermediate contacts 408, 410, respectively, of the second row, the main terminal 30 of the flasher device 22 is connected to the middle fixed contact 409 of the second row and the stop light switch 19 is connected to the middle fixed contact 405 of the first row.

The switch 401 has a carrier (not shown) in which two pairs of bridge contacts are mounted and spring urged towards the fixed contacts. The first pair of bridge contacts 412a and 412b is associated with the first row of fixed contacts and each bridge contact 412a, 412b is longer than the distance between adjacent fixed contacts 404, 405 and 405, 406 of the first row. The adjacent ends of the bridge contacts 412a, 412b are spaced by a distance less than the width of the middle fixed contact 405.

Each of the second pair of bridge contacts 413 and 414 is of inverted T shape and has a head portion and a stroke portion. The length of each head portion is greater than the distance between adjacent fixed contacts of the second row. Each stroke portion is longer than the distance between the rows of contacts.

In a side position, one bridge contact of the second pair engages an intermediate fixed contact and the adjacent end fixed contact of the second row the other bridge contact of the second pair engages the middle fixed contact and the other intermediate fixed contact of the second row and the adjacent fixed contact of the first row, and one of the first pair of bridge contacts engages the middle fixed contact of the first row and the end fixed contact not engaged by the other bridge contact of the second pair.

The operation of the system is similar to that shown in Figs. 1 to 6.

The separate front and rear indicator lamps shown in Fig. 7 may be replaced by a single side indicator lamp on each side of a vehicle, if desired. In this case, the flasher device is so adjusted that the pilot contacts close upon full energisation of one indicator lamp.

While the embodiments of the present invention, as herein disclosed, constitute preferred forms, it is to be understood that other forms may be adopted, all coming within the scope of the claims which follow:

What is claimed is as follows:

1. A vehicle direction indicator system incorporating an indicator lamp on each side of the vehicle, a flasher device for effecting periodic energization of said indicator lamps, a pair of pilot lamps, a pair of pilot lamp contacts in said flasher engageable upon full energization of either of said indicator lamps, an electrical switch having a member movable from an intermediate off position to two side positions, said movable member in the latter positions being effective to energize a circuit from the flasher device to the indicator lamp on the corresponding side of the vehicle, a circuit connecting said pilot lamps to one of said pilot lamp contacts, and a pair of terminals in said switch selectively engageable by said movable member to establish a circuit between one of said pilot lamps and the indicator lamp at the side of the vehicle opposite the adjusted positions of said movable member.

2. A vehicle direction indicator system incorporating a pair of indicator lamps on each side of the vehicle, a flasher device for effecting periodic energization of said indicator lamps, a pair of pilot lamps, a pair of pilot lamp contacts in said flasher engageable upon full energization of either of said pairs of indicator lamps, an electrical switch having a member movable from an intermediate off position to two side positions, said movable member in the latter positions being effective to energize a circuit from the flasher device to the indicator lamp on the corresponding side of the vehicle, a circuit connecting said pilot lamps to one of said pilot lamp contacts, and a pair of terminals in said switch selectively engageable by said movable member to establish a circuit between one of said pilot lamps and the indicator lamp at the side of the vehicle opposite the adjusted position of said movable member.

3. A direction indicator system for a motor vehicle including right and left turn indicator lamps, a turn indicator switch having a plurality of fixed terminals including two indicator lamp terminals, a central terminal and two pilot lamp terminals, a movable member having two bridge contacts slidably engageable with said terminals, a pair of circuits each connecting one of said indicator lamps to one of said lamp terminals, a source of current for said lamps, an automatic flasher device connected in series between said source and said central terminal of said switch, said flasher device being adapted to periodically reduce current flow to said switch, a pair of pilot lamps, a circuit connecting both of said pilot lamps to a terminal on said flasher, a pilot lamp switch in said flasher adapted to connect said terminal on said flasher to said source of current only upon full energization of an indicator lamp, and a pair of circuits each connecting one of said two pilot lamps to one of said two pilot lamp terminals, said movable member being adjustable from an intermediate neutral position to two side positions in each of which one bridge contact connects one indicator lamp terminal to said central terminal to energize said indicator lamp through said flasher device and the other bridge contact connects the other indicator lamp terminal to one pilot lamp terminal to connect said other indicator lamp to said source through said pilot lamp.

References Cited in the file of this patent

UNITED STATES PATENTS

| | | |
|---|---|---|
| 2,656,426 | Dibelka | Oct. 20, 1953 |
| 2,669,704 | Hollins | Feb. 16, 1954 |